United States Patent [19]
Cook

[11] Patent Number: 5,351,332
[45] Date of Patent: Sep. 27, 1994

[54] WAVEGUIDE ARRAYS AND METHOD FOR CONTRAST ENHANCEMENT

[75] Inventor: Lee M. Cook, Spencer, Mass.

[73] Assignee: Galileo Electro-Optics Corporation, Sturbridge, Mass.

[21] Appl. No.: 18,576

[22] Filed: Feb. 17, 1993

Related U.S. Application Data

[63] Continuation-in-part of Ser. No. 853,238, Mar. 18, 1992, Pat. No. 5,259,057.

[51] Int. Cl.⁵ .............................................. G02B 6/08
[52] U.S. Cl. .................................. 385/116; 385/120; 385/123
[58] Field of Search ................ 385/115, 116, 120, 123

[56] References Cited

U.S. PATENT DOCUMENTS

5,259,057 11/1993 Cook ............................... 385/115 X

Primary Examiner—John D. Lee
Assistant Examiner—Phan Thi Heartney
Attorney, Agent, or Firm—Watson, Cole, Grindle & Watson

[57] ABSTRACT

Optical waveguide array imaging devices have a darkened surface layer in the cladding portion. The imaging devices of the invention have high contrast which is generally independent of pathlength. A method for contrast enhancement in such arrays is disclosed.

35 Claims, 4 Drawing Sheets

WAVEGUIDE ARRAYS AND METHOD FOR CONTRAST ENHANCEMENT

RELATED APPLICATION

This application is a continuation-in-part of U.S. patent application Ser. No. 07/853,238, filed Mar. 18, 1992 now U.S. Pat. No. 5,259,059.

BACKGROUND OF THE INVENTION

The invention relates to waveguide arrays such as fiber optic face plates, and other fiber optic imaging devices. In particular, the invention relates to such devices having integral contrast enhancement and a method for producing the same.

Fiber optic face plates (FOFPs) are exemplary of image transfer devices generally consisting of coherent lattice arrays of step index waveguides which act as image plane transfer devices, i.e. they "pipe" an image from the input surface to the output surface. Other known image transfer devices include image conduits, microconduits, tapers, inverters, flexible image scopes, light guides, individual fibers and fused fiber optics.

Figures 1, 2, 3:
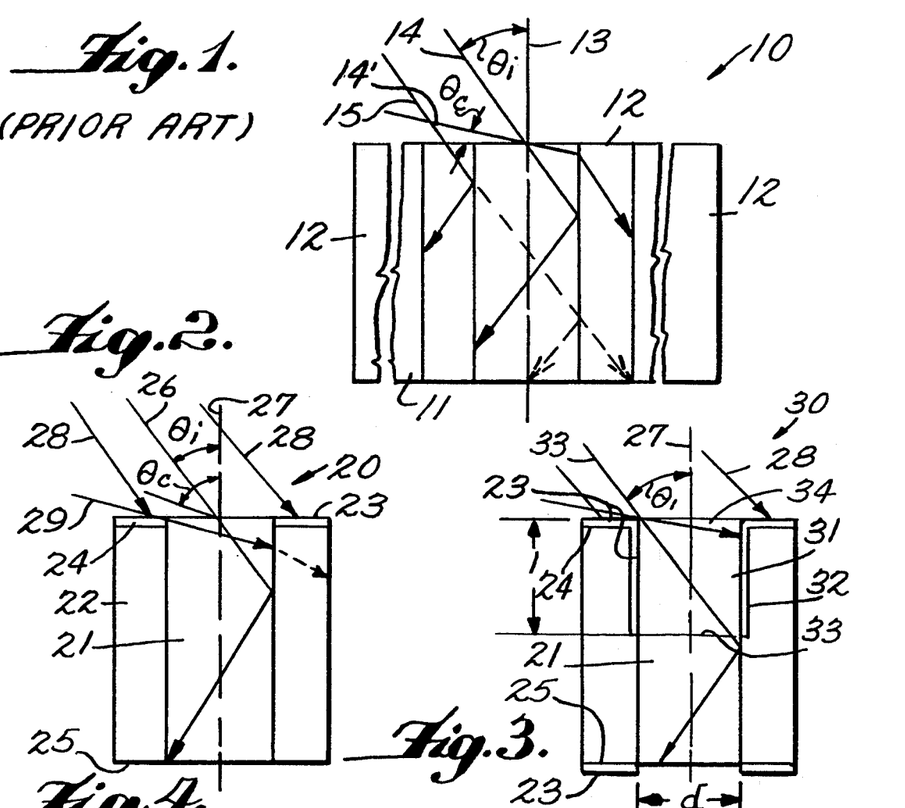
FIG. 1 is a fragmentary side sectional view of a known waveguide array in the form of a fiber optic face plate.
FIG. 2 is a fragmentary side sectional view of a waveguide array according to one embodiment of the invention in the form of an exemplary fiber optic face plate with illustrative ray traces.
FIG. 3 is a fragmentary side sectional view of a waveguide array according to another aspect of the invention having an intagliated surface formed of etched cavities.

A fragmentary cross-section of a known FOFP 10 is illustrated in FIG. 1. The structure of the FOFP 10 generally consists of a two phase array of optical waveguides each including a high refractive index (e.g., $n_1$) core glass 11, each of which is surrounded by a contiguous second phase of lower index (e.g., $n_2$) cladding glass 12.

The glasses most commonly used for FOFPs are high refractive index lead silicates for the core material (e.g. Schott F7 or SF6) and low refractive index borosilicates for the cladding (e.g. Corning 7052). The core glass 11 has a center axis 13. Immediately adjacent to the cladding 12 on either side are neighboring cores 11. A typical FOFP used in imaging applications utilizes waveguides packed in a hexagonal lattice with a center-to-center spacing of 6 $\mu$m and a core diameter of 5 $\mu$m. The faces of the exemplary FOFP consist of about 70% core and about 30% cladding area. As sometimes used herein, the term open area ratio is the core area divided by the total active area of the device.

The mode of light transmission in imaging devices like the FOFP 10 in FIG. 1 is as follows. An incident light ray 14 at some incident angle $\Theta_i$ relative to the center axis 13 enters the core 11 of the FOFP. If the sum (90-$\Theta_i$) is greater than the critical angle for total internal reflection $\Theta_c$, the incident ray 14 is not refracted into the cladding 12 but is instead completely reflected down the core 11, as shown. Incident rays 14' where the sum (90-$\Theta_i$) is less than $\Theta_c$ are refracted and pass into the cladding phase 12, where they are free to enter adjacent cores. This is the most commonly discussed mode of cross-talk between constituent fiber elements in FOFPs.

A commonly used measure of the acceptance angle of a waveguide, within which total internal refraction occurs, is the Numerical Aperture (N.A.), defined as N.A.=$\sin(90-\Theta_c)=(n_1^2-n_2^2)^{0.5}$. Thus for the case where the N.A. of each waveguide in the FOFP is 1.0, $\Theta_c$ is 0°, and light up to 90° off normal incidence is totally internally reflected. For the case of an N.A. of 0.5, $\Theta_c$ is 60°, and incident light of up to 30° off normal incidence is totally internally reflected.

Also shown in FIG. 1 is the case where an incident ray 15 of angle $\Theta_i$ enters the cladding phase 12 instead of the core. In this case, instead of being totally internally reflected, the ray 15 is partially refracted (shown as a dotted line) into the core 11. The other portion of the incident ray 15 (shown as a solid line) is reflected back into the cladding 12, which being a common phase leads to diffusion over a wide area. Portions of reflected rays also enter adjacent cores at each subsequent reflection, leading to cross-talk. This type of cross-talk is not commonly considered as a source of image quality degradation in FOFPs but it is quite significant.

Absorbing glasses are often incorporated into FOFPs to suppress cross-talk. These materials, generally termed Extra-Mural Absorbers (EMAs) are incorporated in three ways, namely: a) as absorptive coatings applied to the outside of each individual waveguide (circumferential EMA); b) a fraction of the waveguides are randomly substituted by absorbing fibers (substitutional EMA); and c) absorbing fibers are inserted into the interstitial packing vacancies in the array (interstitial EMA).

At first glance, circumferential EMA would seem to be the most effective option. In practice it is the least effective as the absorbing glasses commonly used have insufficient absorption intensity at their final thickness (<1 $\mu$m) to be effective. Substitutional EMA is also ineffective and also acts as an obscuration or defect. The most effective configuration to date is interstitial EMA. However, interstitial EMAs are usually wavelengths selected and do not exhibit broad band effects. Concepts for incorporation of various types of EMAs may be found in U.S. Pat. Nos. 3,060,789, 3,247,756, 3,253,500, 3,387,959, 4,011,007 and 3,836,809.

Whether effective to satisfactorily prevent cross-talk or not, EMAs, by definition, are absorbers. Accordingly, the image intensity is attenuated and hence, image quality degrades as a result of absorption as the device thickness or length increases to any significant degree. Typically a device longer than a few millimeters will have unsatisfactory image quality for certain applications. The prior art thus requires a trade off between contrast and intensity.

From the above discussion it is apparent that it would be highly desirable to suppress cross-talk by preventing incident light from entering the cladding. In principle this could be done by laying down an opaque mask having holes of diameter and spacing equal to those of the cores of the elements of the FOFP. In practice this is impossible because of the high degree of misorientation and packing imperfections found in FOFPs.

The concept of darkening glass surfaces in a reducing atmosphere is known. In U.S. Pat. No. 2,314,804, glasses containing PbO or CuO are exposed to Hydrogen at elevated temperatures to create opaque surface layers which are later selectively removed by grinding and polishing to create decorative effects.

In U.S. Pat. No. 2,339,928, lead-containing fibers are exposed to hydrogen at elevated temperatures to achieve a fast color. Treatment temperature is limited to no more than 400° C.

In U.S. Pat. No. 3,650,598 high temperature reduction in Hydrogen for gradient index (GRIN) cylindrical rod optics to darken the outer walls of the cylinder and suppress cross-talk is shown. This patent is specifically restricted to GRIN optics and does not teach incorporation into an FOFP.

In U.S. Pat. No. 4,989,960, a process for blackening the perimeter of lenses in a reducing atmosphere at elevated temperature to suppress reflected stray light is shown.

The above examples either teach the general concepts of hydrogen reduction to for blackened surface layers or teach the use of such blackened layers along the outer length of a cylinder (either rod or lens) to suppress reflected stray light by absorption.

U.S. Pat. No. 3,582,297 teaches the concept of generating an opaque surface mask to prevent stray light from entering the cladding. The patent teaches the use of high temperature ion exchange of silver with constituents of the cladding glass (i.e. mobile alkali ions). The silver enriched layer is preferably reduced by hydrogen at an elevated temperature to form a relatively deep opaque surface layer (e.g. $>15$ $\mu$m) which then acts as a mask to prevent stray light from entering the cladding.

The resulting product and method taught by U.S. Pat. No. 3,582,297 has several significant shortcomings. Generally only a limited amount of silver may be ion-exchanged. This results in less intense absorption, requiring relatively thick surface layers to be effective. Silver ion exchange generally uses a molten salt bath or paste of silver salts. Such solutions often cause corrosion or deterioration of the polished surface layer (especially on the core glass of the composite), which degrades the optical performance of the device. Such corrosion is extremely undesirable in demanding applications such as windows for Charge Coupled Devices (CCDs), where extremely low light scattering and obscuration are desired. Silver ion exchange results in an increase in fluorescence on exposure to short wavelength radiation (ref. W. Weyl et al., "On the fluorescence of atomic silver in glasses and crystals", *J. Electrochem. Soc.*, vol. 95, p. 70, 1949). Such an effect is highly undesirable in many low light imaging systems (e.g. image-intensified CCDs) where the fluorescence would significantly degrade image contrast. Silver ion exchange followed by reduction produces surfaces which are electrically conductive. This conductivity has been deliberately exploited in the prior art to produce conductive circuits on glass surfaces. Surface conductivity is highly undesirable for applications such as image-intensified CCD systems where the fiberoptic must act as an insulator.

SUMMARY OF THE INVENTION

The present invention obviates and eliminates the shortcomings and limitations of the described prior arrangements. In particular, the present invention is directed to a process for treating waveguide arrays such as FOFPs and like imaging devices so as to make the cladding opaque at the surfaces without altering the surface shape or quality of the device and without introducing fluorescence or electrical conductivity into the surface layer. In one embodiment this is accomplished by using a cladding glass which contains reducible cations, preferably Lead or Bismuth, in conjunction with a core glass altogether free from reducible cations or, alternatively, a core glass containing said cations but with markedly higher viscosity (i.e. $T_g$ or softening point) than the cladding glass. Waveguide arrays prepared from such a glass system are then exposed to a reducing atmosphere (e.g. Hydrogen) at an elevated temperature. Ideally this temperature should not exceed the softening point of the lowest viscosity glass component, usually the reducible glass. Exposure results in a darkening of the cladding glass at all exposed surfaces, making the cladding opaque to incident light for a small depth, typically $\sim 1$ micron. The treatment temperature is deliberately chosen such that no measurable deformation of the array can occur. This allows finished devices to be so treated without the need for reshaping or refinishing. Such reworking would necessarily remove the blackened cladding layer. While the blackened cladding provides sufficient contrast improvement for most uses, it may also be utilized in conjunction with any other prior art EMA configurations to further improve image contrast.

Waveguide arrays having a cladding glass containing reducible cations (e.g. Pb, Bi, etc.) together with a core glass either free from said reducible cations or with a substantially higher glass transition temperature are exposed to a reducing atmosphere at a temperature not to exceed the softening point of the lowest viscosity glass. The exposure results in the formation of an opaque (blackened) surface layer on the cladding glass only without deformation of the shape of the object. The blackened layer is substantially free from fluorescence and electrical conductivity. The blackened cladding surfaces prevents incident light from entering the cladding and prevents light propagated into the cladding from the core during light passage through the array from exiting the array. This results in substantially improved imaging contrast.

The invention is also directed to a waveguide arrays including flexible and rigid imaging devices comprising a plurality of fiber optic waveguide segments each having a core and cladding. The cladding is preferentially reducible relative to the core. Such devices have opposite optically finished ends lying in a parallel axial array exposing portions of the core and the cladding. At least one of the ends has a cladding portion forming a darkened surface layer to a depth sufficient to absorb incident radiation directed at the cladding and render the exposed portions of the cladding opaque for enhancing contrast and reducing cross-talk.

In another embodiment, the end surface is intagliated with a cavity for each waveguide formed in the end thereof. Each cavity has side walls formed of exposed cladding. The end of the core is recessed relative to the cladding. The exposed cladding, including the side walls of the cavity, also have the darkened surface layer, resulting in an effective numerical aperture which eliminates cross-talk from core incident light.

The present invention is not limited to arrays of waveguides but is applicable to individual optical waveguides. Also, the invention is not limited to a waveguide of any particular composition or length other than that which may occur as a result of attenuation in the core and cladding materials. The length of the waveguides may be extended substantially from less than a few millimeters without degrading the image quality.

DESCRIPTION OF THE INVENTION

One embodiment of the present invention is shown in FIG. 2. A waveguide array in the form of a fiber optic face plate (FOFP) 20 is formed with a plurality of optical waveguides (only one full waveguide is shown) having a core 21 and a cladding 22 which are glass phases. In the preferred embodiment, the cladding glass 22 contains reducible cations such as Lead, Bismuth, Arsenic or Tin or mixtures thereof. The core glass 21 is preferably altogether free of such reducible cations. Alternatively, the core glass 21 contains said cations but with a higher viscosity (i.e. $T_g$ or softening point) than the cladding glass 22. An opaque surface layer 23 is selectively formed on the outer exposed surface 24 of the cladding 22 by exposure to reducing conditions. This opaque surface layer 23, typically of thickness below 2 microns, is integral and conformal due to its mode of formation. In the embodiment described, the core glass is unreactive. Thus, there is no need to mask each core 21.

An incident ray 26 entering the core at angle $\Theta_i$ relative to the center axis 27 of the core 21 shows the same total internal reflection behavior as in FIG. 1. Incident light 28 impinging on the surface layer 23 covering the cladding 22, is absorbed and cannot enter the cladding. Therefore a substantial fraction of fiber-to-fiber cross-talk is eliminated.

In the embodiment illustrated, the FOFP 20 is prepared prior to processing with optically finished sides or end faces 24 and 25. The formation of the opaque surface layer 23 is shown only on one side 24 but it is preferably formed on both sides 24 and 25 to further reduce cross talk and light transmitted through the cladding which may escape the cores. The optical finish remains intact after processing in accordance with the present invention. As a result the finished sides 24 and 25 of the surfaces of the FOFP 20 are optically equivalent before and after processing. Accordingly, advantageous processing economies are realized. For example, post processing reworking or refinishing of the array is obviated.

Several examples have been prepared to demonstrate the effects of the present invention on image contrast in FOFPs.

EXAMPLE 1

Examples of fiber optic face plates were prepared from two glasses. The center-to-center spacing of waveguides in the sample was 25 μm. The core glass is substantially free from reducible cations other than trace amounts of arsenic added for refining purposes. The cladding glass contains ~29 weight % PbO. Thermal properties are:

Core glass: $T_g=525°$ C., $T_{soft}=701°$ C.

Cladding glass, $T_g=~410°$ C., $T_{soft}=630°$ C.

A sample FOFP was heat treated at 425° C. for 6 hours at under 35 mm Hydrogen pressure. This temperature is equivalent to the transition temperature Tg of the cladding glass but is well below its softening point T soft as well as the transition temperature of the core glass. Thus no deformation of the sample was expected. After reduction, the FOFP had no perceptible dimensional change due to the heat treatment and was a pleasing neutral gray. Examination under a microscope confirmed that the cladding glass had been darkened to the extent that it was opaque. An improvement in the sharpness of edges for the darkened sample over the untreated sample was observed. Light spreading into the cladding from illuminated areas was clearly evident in the unreduced sample. Stray light is completely eliminated in the reduced sample.

Comparison of light transmission at 550 run before and after reduction showed a decrease of 30%, equivalent to the surface area fraction of the cladding glass phase. Thus, the transmission of incident light through the darkened cladding glass surface is negligible (<1%).

EXAMPLE 2

Samples of fiber optic face plates were prepared from two glasses. The center-to-center spacing of waveguides in the sample was 6 μm. The core glass contains ~10 weight % PbO. The cladding glass contains ~29 weight % PbO. Thermal properties are:

Core glass: $T_g=550°$ C., $T_{soft}=703°$ C.

Cladding glass: $T_g=~410°$ C., $T_{soft}=630°$ C.

A sample FOFP was heat treated at 425° C. for 6 hours at under 35 mm Hydrogen pressure. This temperature is well below both the transition temperature of the core glass. Thus no deformation of the sample was expected. After reduction, the FOFP had no perceptible dimensional change due to the heat treatment and was a pleasing neutral gray. Examination under a microscope configured that the cladding glass had been darkened to the extent that it was opaque. In contrast, the core glass was not reduced, even though it contained reducible cations. Improvement in the sharpness of edges for the darkened sample over the untreated sample was observed. Light spreading into the cladding from illuminated areas was clearly evident in the unreduced sample. The stray light was completely eliminated in the reduced sample.

As in the first example, the decrease in light transmission at 550 nm after reduction was 28%, equivalent to the surface area fraction of the cladding glass phase.

Thus, the transmission of incident light through the darkened cladding glass surface is negligible (<1%).

The change in contrast following the reduction was also evaluated. Contrast was measured by observing a change in light intensity as a function of position in the transmitted image of a 2.5 micron wide knife edge slit at 20X magnification under diffuse illumination. Contrast is measured by the distance required to go from 5% to 95% transmission across the knife edge (i.e. decreased distance equals improved contrast). The reduced sample showed considerable improvement in contrast ($5\%-95\%_{unreduced}=44.5$ microns vs. $5\%-95\%_{reduced}=30.2$ micron, >30% improvement).

Despite the improved results illustrated in Examples 1 and 2, under certain conditions an incident light ray 29 (FIG. 2) whose angle of incidence is beyond the critical angle $\Theta_c$ can still cause cross-talk. This source of cross-talk becomes more pronounced as the N.A. of the FOFP is reduced (i.e. as the critical angle $\Theta_c$ approaches nodal incidence). Accordingly, another embodiment of the present invention, shown in FIG. 3, is effective to prevent this latter remaining source of cross-talk.

A waveguide array in the form of an FOFP 30 of core diameter d is exposed to chemical solutions (e.g. HF) which preferentially dissolve away the core 21 to produce a cavity 31 having wall portions 32 and a bottom 33. The walls 32 are exposed portions of the cladding 22 and the bottom 33 is the exposed end of the core 22. The cavity 31 has a depth 1. This process, known as intagliation, has been commercially employed in the television industry, primarily for the purposes of implanting phosphor compounds within the etched cavity. The quantity d/1 is known as the aspect ratio of the etched cavity 31.

The intagliated FOFP 30 is then exposed to a reducing atmosphere at elevated temperature to for an integral opaque surface layer 23 on all exposed cladding glass surfaces 24, 25 and 32 but not the exposed core. Because the incident surface of the core 21 is physically recessed within an opaque well, only incident light 33 of a maximum angle $\Theta_i$, where $\tan(\Theta_i) = d/1$, can possibly enter the core 21. If the aspect ratio d/1 of the etched cavity 31 is adjusted such that $(90-\Theta_i)$ is above the critical angle $\Theta_c$ for total internal reflection, all of the light incident on the core is totally internally reflected, completely suppressing cross-talk. Light 34 having a grazing incidence is blocked by the surface layer 23 along the sidewalls of the cavity 31. As in FIG. 2, light 28 impinging on the cladding surface 23 is absorbed, eliminating that source of cross-talk as well.

Figure 4:
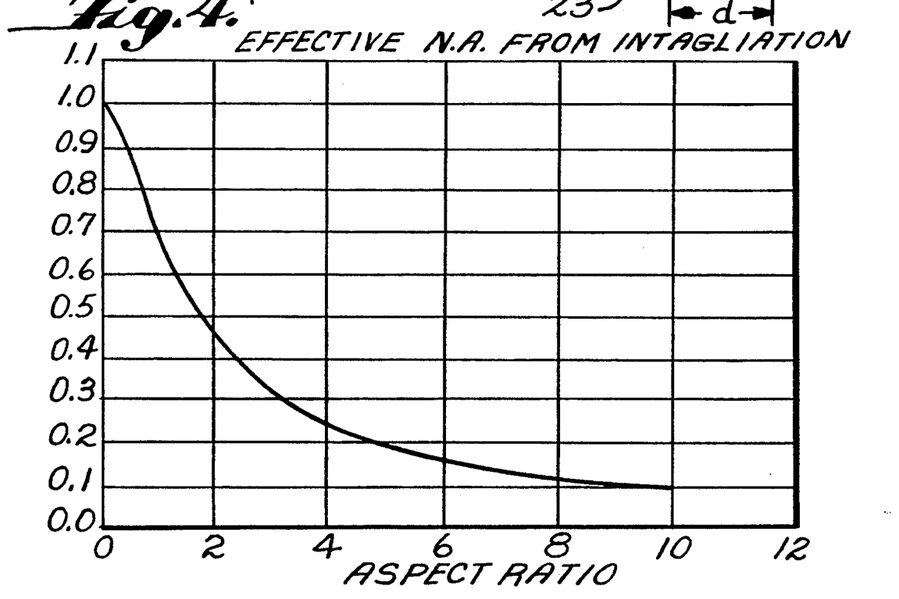
FIG. 4 is a plot of effective numerical aperture versus the aspect ratio of the etched cavities in FIG. 3.

In accordance with the foregoing, an effective N.A. for an FOFP may be derived based on the masking effect described above. The relationship between effective N.A. and aspect ratio d/1 is plotted in FIG. 4. In the plot, for any given core diameter d, the intagliation depth 1 necessary to produce the desired effective N.A. can be found.

This concept can be put to a variety of practical uses. First, by ensuring that the effective N.A. due to the present invention is less than the N.A. calculated from $(n_1^2-n_2^2)^{0.5}$ (i.e. the Optical N.A.), cross-talk may be entirely suppressed. For the case of an FOFP whose Optical N.A. is 1.0, any intagliation depth will suffice. Increasing intagliation aspect ratios are required as the Optical N.A. decreases.

Alternatively, FOFPs of any desired effective N.A. may be produced from a single material, thus allowing a variety of optically different products to be manufactured from the same block of material, effecting substantial reductions in inventory and production costs. The effective N.A. can also be adjusted to any level consistent with desired off-axis noise rejection so as to suppress stray light.

While the general concepts of total internal reflection and intagliation are known in the prior art, the combination of properties taught by the present invention has not heretofore been discussed. The invention yields a surprising variety of optical effects without the deficiencies associated with prior art systems which render the achievement of such effects impractical. For example, the present invention avoids high temperature processes which can cause deformation of the two phase FOFP structure. The present invention satisfactorily achieves cross-talk reduction in an optically finished product without further processing and without optical degradation. Further, the present invention produces an electrically benign opaque coating which is nonconductive having a resistivity of >10 ohm cm, and thus does not interfere with the insulating function of an FOFP. As a result, the FOFP or other suitable imaging waveguide array may be directly coupled to an image intensified CCD. Finally, the process for masking does not impart deleterious secondary emission, e.g., fluorescence to the array which can cause loss of resolution.

Figures 5A, 5B:
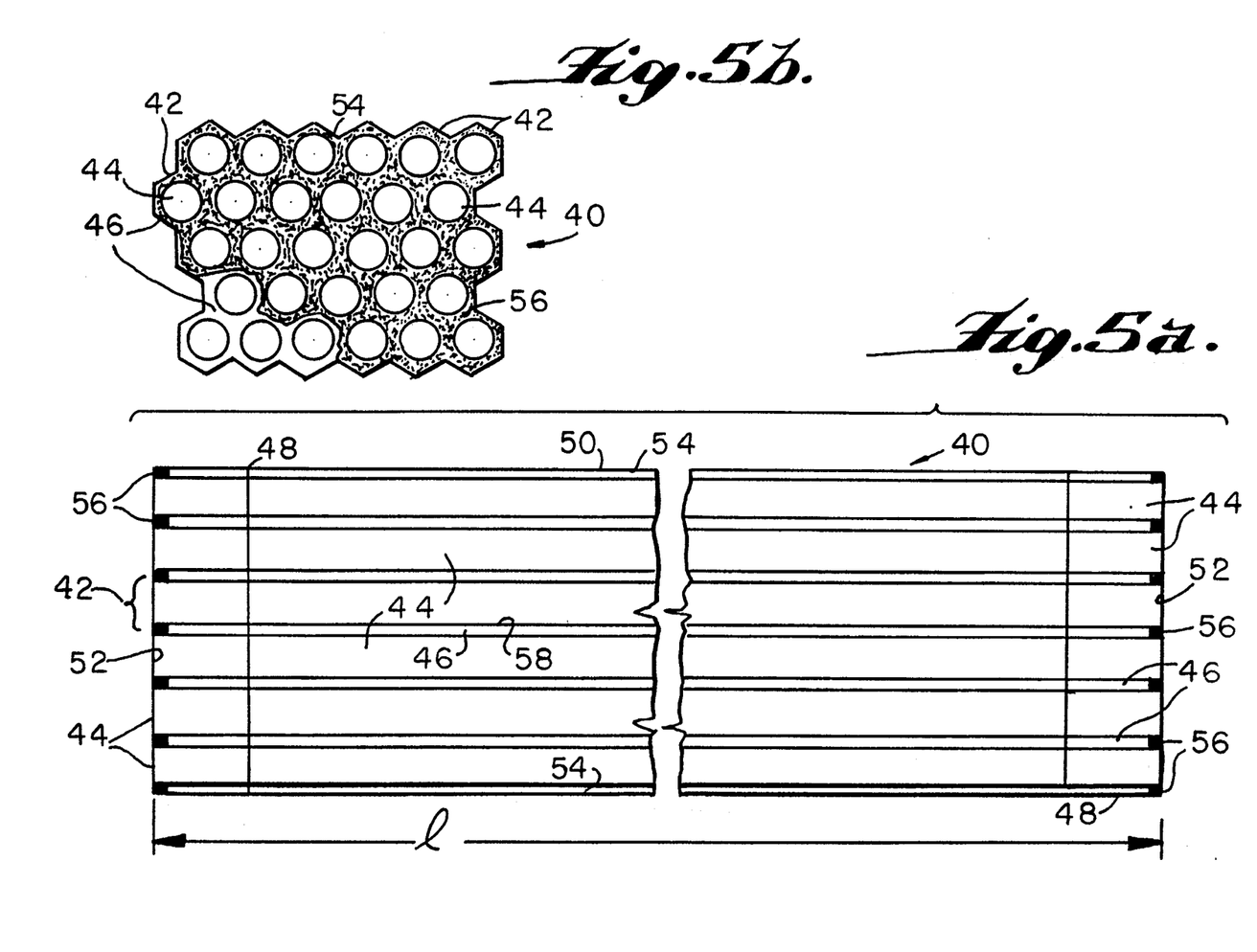
FIGS. 5a and 5b are fragmentary side and end views of an elongated waveguide array in accordance with the teachings of the present invention.

FIGS. 5 and 6 are respective fragmentary side and end views of an exemplary waveguide array in the form of an elongated fiber optic image transfer device 40. The device 40 includes a plurality of optical fibers 42 packed in a hexagonal array as shown in the end view of FIG. 6. Each waveguide includes a core portion 44 and a cladding portion 46. The waveguides 42 may be fused together in a single elongated body of length 1 (as shown) alternating or only the end portions 48 may be fused together and the intermediate portion 50 may be flexible. End surfaces 52 are finished and the cladding portion of either or both end surfaces 52 thereof may have an opaque end surface layer 56 formed as herein above described.

In the present invention, the darkened end surface layer 56 substantially prevents incident radiation from entering the cladding phase 46 of the waveguide array 40. Further, the cladding phase 46 does not contain specially included light absorbing material (i.e., interstitial EMA). Thus, each waveguide 42 consists of a core 44 and cladding 46 having a core/cladding interface 58 substantially free of added materials other than impurities in the glasses which would cause attenuation of the radiation by absorption, scattering or other loss mechanism. Thus, depending on the purity of the core and cladding glass, the length 1 of the waveguide array 40 may be determined generally with regard only to the attenuation which may occur in the core 44 and cladding 46 or from mechanical losses associated with micro or macro bending of the optical fibers 42 forming the array 40.

Figure 6:
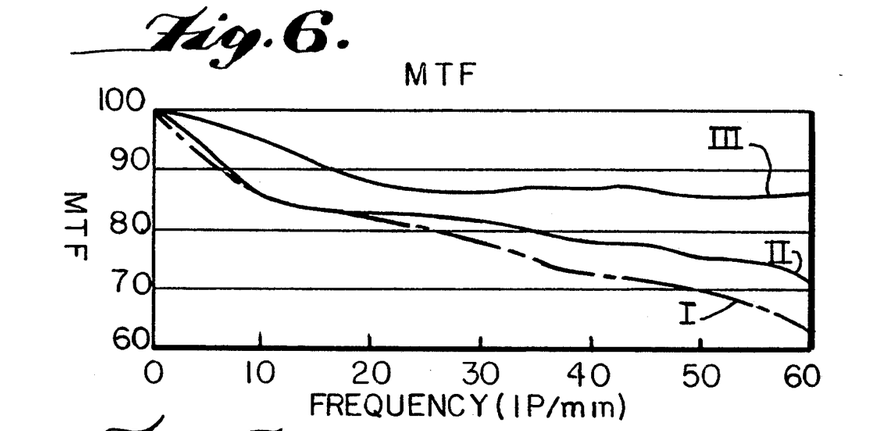
FIG. 6 is a comparative plot of the modulation transfer function (MTF) as a percent versus image spatial frequency in lines per millimeter for 2.3 millimeter devices, the data comparing the effect of the present invention with known arrangements.

FIG. 6 is a plot of the modulation transfer function (MTF) versus image spatial frequency in lines pairs per millimeter (lp/mm) for waveguide arrays in the form of fiber optic face plates. Curve represents the modulation transfer function of 2.3 millimeter fiber optic face plate without an extramural absorber (EMA) without the surface treatment of the invention. The modulation transfer function, which is a good indicator of contrast, drops significantly as the spatial frequency of the line standard increases as illustrated.

Curve II is a plot of the MTF versus line frequency of a 2.3 millimeter fiber optic face plate having an interstitial extramural absorber. The contrast is similar to the plain fiber optic face plate up to about a line frequency of about 18 lp/mm. Although the MTF drops as the line frequency increases thereafter, it is not as severe as the plain fiber optic face plate.

Curve III is a plot of MTF versus line frequency for a 2.3 millimeter fiber optic face plate having a surface treatment in accordance with the present invention. It can be readily appreciated that the MTF is improved over the entire range of measurements and has a virtually a flat response from about 20 lp/mm on out to 60 lp/mm where the measurements terminate.

Figure 7A:
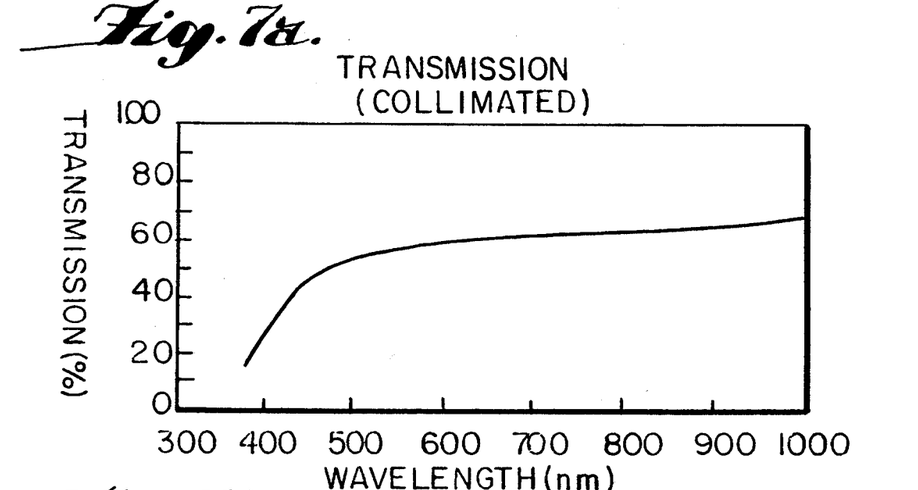
FIG. 7a is a plot of transmission as a percent of input energy versus wavelength in nanometers for a 13.2 millimeter device with interstitial EMA treated in accordance with the teachings of the present invention.
Figure 7B:
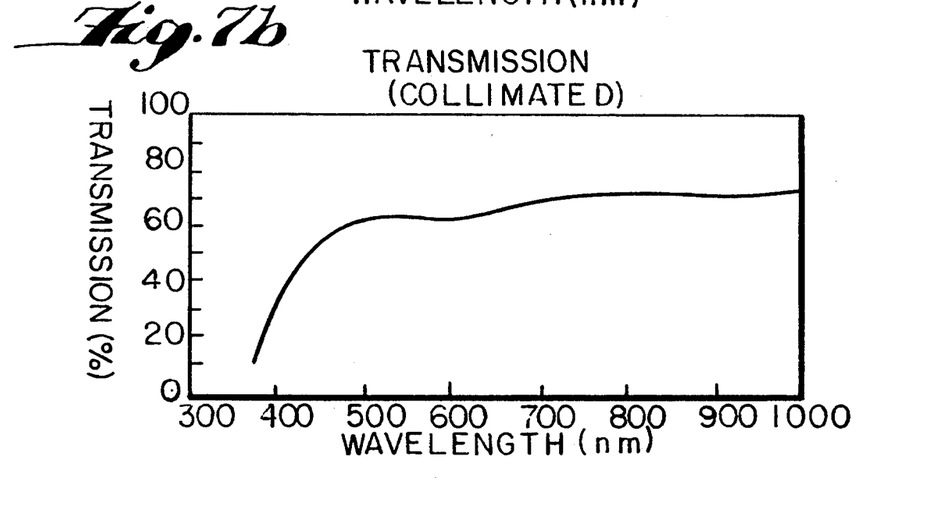
FIG. 7b is a plot of transmission as a percent of input energy versus wavelength in nanometers for a conventional 13.2 millimeter device with interstitial EMA.

FIGS. 7a and 7b are comparisons of the transmission of 13.2 millimeter fiber optic face plates having interstitial EMA. In FIG. 7a, the device is treated in accordance with the present invention. In FIG. 7b, the device has no such treatment. The transmission characteristic of the treated fiber optic face plate is virtually uniform although increasing over the visible spectrum from about 450 to about 1,000 nanometers. In FIG. 7b, the transmission is slightly higher over the entire wavelength range and has slight peaks at about 500 and about 740 nanometers. The increased overall transmission is due to the fact that the cladding portion of the fiber optic face plate allows cross-talk which reaches the detector. This light has a deleterious effect on the contrast as hereinafter discussed. The peaks at 500 and 740 nm in FIG. 7b represent a somewhat selective transparency of the interstitial EMA to those wavelengths. In FIG. 7a, however, it is apparent that the surface treatment has a relatively uniform effect on all the wavelengths in the band of interest thus resulting in a somewhat neutral density filtering effect.

Figure 8A:
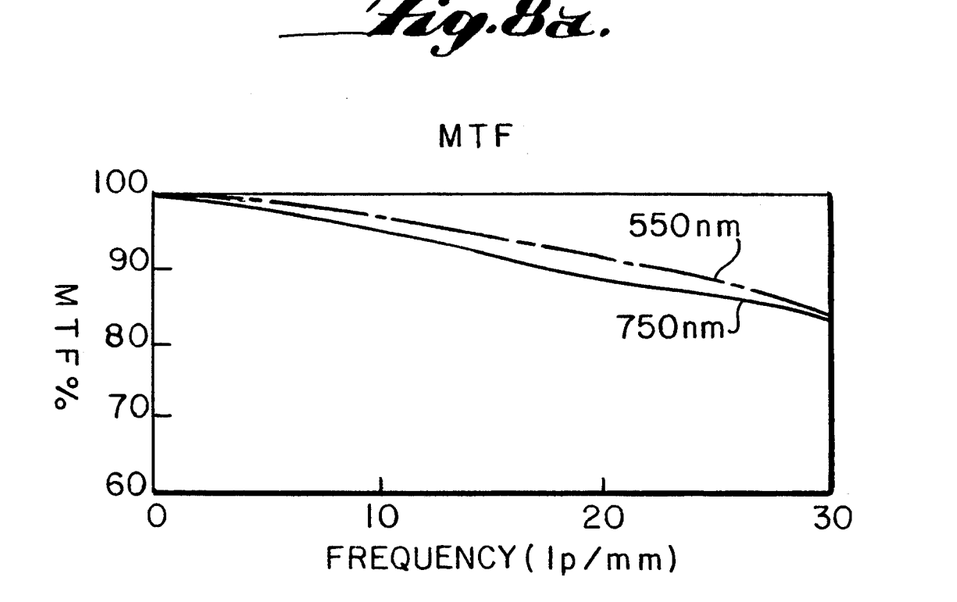
FIG. 8A is a plot of MTF versus spatial frequency in lines per millimeter at 550 nm and 750 nm for a 13.2 millimeter device with interstitial EMA treated in accordance with the teachings of the present invention.
Figure 8B:
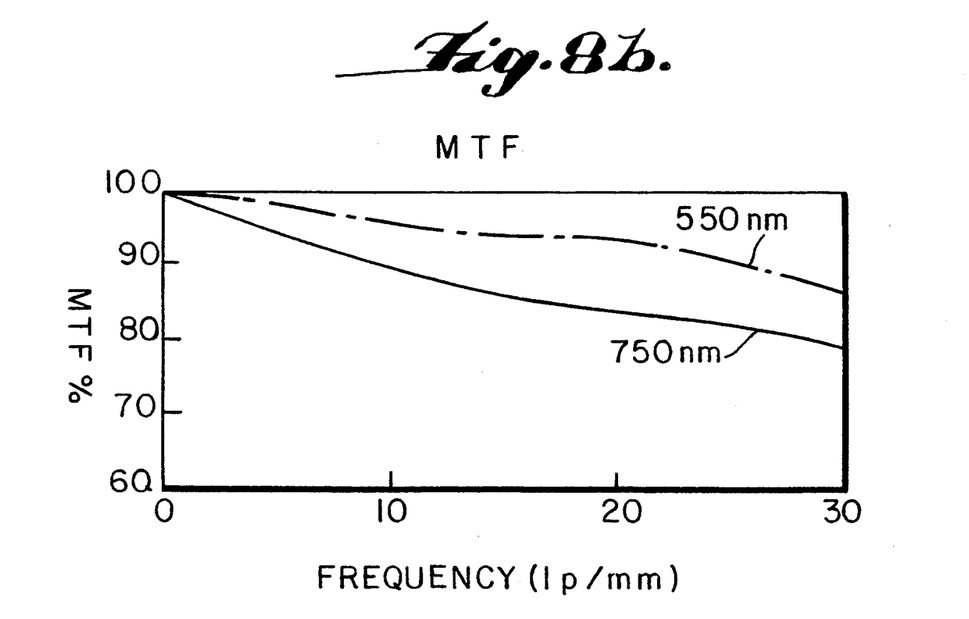
FIG. 8B is a plot of MTF versus spatial frequency at 550 nm and 750 nm for a conventional 13.2 millimeter device with interstitial EMA.

FIGS. 8a and 8b represent, respectively, the modulation transfer function versus frequency of a fiber optic face plate treated in accordance with the present invention and an untreated device at two different wavelengths, namely, 550 and 750 nanometers. The modulation transfer function of the treated fiber optic face plate is uniformly better across the frequency band shown in FIG. 8a in comparison to the untreated device in FIG. 8b. Also, the device has an improved modulation transfer function especially at the wavelength 750 nanometers in the near infrared which is useful for many applications. The plot in FIG. 8a also illustrates that the fiber optic face treated in accordance with the present invention has a relatively uniform contrast characteristic which is virtually independent of wavelength and much improved over the prior arrangements. Finally, it is apparent from the results illustrated in FIGS. 8a and 8b that a fiber optic face plate having the surface treatment in accordance with the present invention performs better than a fiber optic face plate having interstitial EMA. Indeed the present invention improves the performance of a fiber optic face plate having such interstitial EMA.

The present invention results in a reduction in the absorption of light energy propagating along the waveguide and thus suffers little or no reduction in contrast as a result of the length of the device. Whatever degradation occurs in the image results from attenuation in the core and cladding portions as a result of glass impurities. Prior arrangements using interstitial EMA, on the other hand, cause a pronounced reduction in the transmission which negatively effects contrast. Thus, the only limit on the length of the image transfer device in accordance with the present invention occurs from an economic standpoint as to whether it is practical to assemble a long device using optical grade or telecommunications grade fibers. The data presented herein suggests that the length of an imaging device in accordance with the present invention may be extended, depending upon the quality of the image required, substantially to the limits of the fibers employed.

In the present invention, transmission of energy is effected generally by the fiber losses which are small. In the prior art, the transmission is negatively effected by the interstitial absorption. At the same time, in a prior art device, a greater absolute Mount of radiation may be carried to the output and image quality may be negatively affected because some of the radiation is incoherent.

In the present invention, there is little transmission loss along the fiber after initial surface masking. In the prior art, interstitial losses eventually degrade transmission so much that contrast is impossible to measure. Thus, the contrast enhancement associated with the present invention is virtually independent of path length. In addition, surface treatment of the optical device in accordance with the present invention is virtually opaque to all visible wavelengths. Thus, the only limitation with respect to wavelength is fiber related. As noted above, interstitial EMA materials are wavelength selective. Thus, it is necessary to design different devices for different wavelength ranges. The present invention, on the other hand, is virtually wavelength independent and the invention has the properties of a neutral density filter.

It should be understood that materials other than glass may be useful in manufacturing waveguide arrays in accordance with the present invention including organic materials. The surface treatment of the devices should be effective to selectively block radiation from the cladding portion. In such devices, the cladding portion is a material which is capable of developing an opaque surface layer in the cladding which absorbs incident radiation without secondary emission.

It should be understood that one or more individual fibers may be treated in accordance with the present invention. Such fibers, when used individually or in an array, would be effective to block spurious input radiation. Such fibers could be employed in imaging and nonimaging applications where spurious radiation and cross-talk between fibers is experienced.

While there have been described what at present are considered to be the preferred embodiments of the present invention, it will be readily apparent to those skilled in the art that various changes may be made therein without departing from the invention and it is intended in the claims to cover such changes and modifications as fall within the true spirit and scope of the invention.

I claim:

1. A fiber optic array for transferring an image with increased contrast comprising:

a plurality of optical waveguides disposed in a coherent array of a selected length, said array being free of extramural absorbers (EMA), each waveguide having a core and cladding, said array having opposite optically finished, fused together end portions exposing corresponding end surface portions of the core and the cladding, at least one of the end portions of the array having a treated darkened cladding surface layer to a depth sufficient to absorb incident radiation directed at the cladding without producing secondary emission to thereby render the exposed portions of the cladding substantially opaque to said incident radiation, and said array having, as a result of such treatment, at least one of a contrast characteristic independent of array length and wavelength; and a transmission characteristic greater than an untreated array and an array with EMA.

2. The array of claim 1, wherein the cladding contains reducible cations and the core is substantially free of said cations.

3. The array of claim 2, wherein the cations are selected from the group consisting of Pb, Bi, As and Sb.

4. The array of claim 1, wherein the core has a substantially higher glass transition temperature is exposed to a reducing atmosphere at a temperature not to exceed the softening point of the lowest viscosity glass to produce said darkened surface layer on the exposed portions of the cladding only without deformation of the shape of the array.

5. The array of claim 1, wherein the transmission of incident light through the surface of the cladding is less than 1%.

6. The array of claim 1, wherein said darkened surface layer is a substantially nonconductive dielectric layer.

7. The array of claim 1, wherein said darkened surface layer is substantially nonfluorescent.

8. The array of claim 1, wherein the core surface portions exposed at said at least one end portion thereof are recessed relative to the cladding portions thereby forming an intagliated surface having cavities with wall portions extending into said array formed of exposed cladding, and the darkened layer extends into said channels along said wall portions.

9. The array of claim 8, wherein each of said optical waveguides has an effective numerical aperture.

10. The array of claim 8, wherein the waveguides have a nominal optical numerical aperture (NA) and cavities have a selected aspect ratio d/l where d is the diameter of the core and l is the length of the cavity extending into said array thereby resulting is an effective NA.

11. The array of claim 10, wherein the effective NA is less than the optical NA.

12. The array of claim 1, wherein the surface layer is $<15\mu$.

13. The array of claim 12, wherein the surface layer is $<4\mu$.

14. The array of claim 12, wherein the surface layer is $<1\mu$.

15. The array of claim 1, wherein the core and cladding have respective glass transition temperatures $T_g$ and the $T_g$ of the core is greater than the $T_g$ of the cladding.

16. The array of claim 1, wherein the cladding has a glass transition temperature $T_g$ and reduction occurs at a temperature of about 50° C. below the $T_g$ of the cladding.

17. The array of claim 1, having a contrast characteristic substantially independent of path length.

18. The array of claim 1 wherein the cladding is preferentially reducible relative to the core.

19. The array of claim 1 wherein the surface treatment rendering the at least one end portion of the cladding results in an increase in contrast in comparison to an untreated array.

20. The array of claim 1 wherein the increase in contrast resulting from said surface treatment of the cladding is independent of path length in the waveguides.

21. The array of claim 1 wherein each of the waveguides are disposed such that at least a selected length of each said waveguides in the end portions of the array are lying in a parallel axial arrangement.

22. The array of claim 21, wherein an intermediate portion between the end portion is flexible.

23. The array of claim 1 wherein the waveguides are arranged in a fused fiber optic array of parallel waveguide segments.

24. The array of claim 1 wherein all exposed cladding portions have the darkened surface layer.

25. The array of claim 1, wherein the contrast characteristic is a measure of a modulation transfer function (MTF) percent, and where said MTF is greater than about 80%, up to at least 60 lp/mm.

26. The array of claim 1, wherein the contrast characteristic is a measure of a modulation transfer function (MTF) percent, and said MTF is relatively flat at wavelength, greater than 20 lp/mm.

27. The array of claim 26, wherein the MTF is uniform in the infra red.

28. The array of claim 1, wherein the array has a transmission characteristic which is uniform.

29. A waveguide image transfer array comprising:
a plurality of optical waveguide segments having a core and cladding lying in a parallel axial array of a selected length, said cladding being preferentially reducible relative to the core, said array having opposite optically finished ends exposing portions of the core and the cladding, at least one of the ends of the array having a reduced cladding portion forming a treated darkened surface layer to a depth sufficient to absorb incident radiation directed at the cladding and to render the exposed portions of the cladding opaque resulting in an enhanced, relatively uniform, array length independent enhanced contrast and reduced cross-talk compared with an untreated array.

30. A method for treating end surfaces of a waveguide array formed of a plurality of optical waveguide segments of a selected length extending between fused together end surfaces thereof, each of said waveguide segments including a core surrounded by a cladding, said cladding being a glass having reducible cations surrounding the core formed of a glass free of said cations and having a substantially higher glass transition temperature comprising the steps of:
exposing at least one surface of the waveguide to a reducing atmosphere; maintaining the reducing atmosphere for a selected time and at a selected temperature sufficient to produce an absorbent, non-fluorescent surface layer on the exposed surface of the cladding glass to a depth sufficient to result in contrast characteristics for the array independent of wavelength and array length.

31. A method for treating end surfaces of a fiber optic image transfer device, formed of a plurality of optical waveguide segments, each of said waveguides including a core surrounded by a cladding and having fused together end portions in a parallel axial array of a selected length, to substantially eliminate cross-talk from light entering surfaces, said cladding being a glass having reducible cations surrounding the core formed of a glass free of said cations and having a substantially higher glass transition temperature comprising the steps of:

exposing at least one surface of the waveguide to a reducing atmosphere for a time and at a temperature sufficient to produce light absorbing, nonfluorescent surface layer on the exposed surface of the cladding glass to a depth sufficient to result in a relatively uniform light transmitting characteristic greater than an unexposed array.

32. The method of claim 31, wherein the device has optically finished end faces after reduction which are optically equivalent the same surfaces before reduction.

33. The method of claim 32, further comprising the step of: recessing the core portion exposed at said at least one end surface relative to the cladding portions thereby forming an intagliated surface having cavities with wall portions formed of exposed cladding, and the surface layer extends into said cavities along said wall portions.

34. A waveguide comprising:
at least one waveguide segment of a selected length having a core and cladding and extending between optically finished ends exposing portions of the core and the cladding, at least one of the ends of waveguide having a surface layer developed in the cladding to a depth sufficient to absorb incident radiation directed at the cladding without secondary emission and to render the exposed portions of the cladding opaque for enhancing contrast and reducing cross-talk relative to an array without developed surface layers.

35. A method for treating at least one end surface of a waveguide formed of a waveguide segment extending between optically finished surfaces each waveguide segment including a core surrounded by a cladding comprising the steps of:
preferentially developing an opaque surface layer in the cladding sufficient to absorb incident radiation directed at the cladding without secondary emission, and to product a contrast characteristic in said waveguide greater than an undeveloped cladding.

* * * * *